United States Patent
Welter

(10) Patent No.: US 9,725,785 B2
(45) Date of Patent: Aug. 8, 2017

(54) PROCESS FOR COLD HYDROCHEMICAL DECOMPOSITION OF SODIUM HYDROGEN ALUMINOSILICATE

(71) Applicant: PLEASON VENTURES LTD, Limassol (CY)

(72) Inventor: Alexander Welter, Hannover (DE)

(73) Assignee: PLEASON VENTURES LTD, Limassol (CY)

( * ) Notice: Subject to any disclaimer, the term of this patent is extended or adjusted under 35 U.S.C. 154(b) by 414 days.

(21) Appl. No.: 14/582,754

(22) Filed: Dec. 24, 2014

(65) Prior Publication Data

US 2016/0186292 A1    Jun. 30, 2016

(51) Int. Cl.
  *C22B 21/00*   (2006.01)
  *C22B 3/44*   (2006.01)

(52) U.S. Cl.
  CPC ............ *C22B 21/0015* (2013.01); *C22B 3/44* (2013.01); *C22B 21/0053* (2013.01); *Y02P 10/234* (2015.11)

(58) Field of Classification Search
  None
  See application file for complete search history.

(56) References Cited

U.S. PATENT DOCUMENTS 3,442,795 A    5/1969 Kerr et al.

FOREIGN PATENT DOCUMENTS

RU    2440296 C2    1/2012
WO    9729992 A1    8/1997

*Primary Examiner* — Melissa Swain
(74) *Attorney, Agent, or Firm* — Michael Fainberg; Arent Fox LLP

(57) ABSTRACT

A process for cold hydrochemical decomposition of sodium hydrogen aluminosilicate. The process includes decomposing sodium hydrogen aluminosilicate at low temperature with a chelate to form a solution of soluble compounds and insoluble contaminants; separating the insoluble contaminants from the solution with a coagulator and heating to coagulate the silicic acid and form a silicic acid gel; separating the silicic acid gel to form a silicic acid-free solution; decomposing the silicic acid-free solution to form a precipitate of sodium hydrogen carboaluminate and a mother liquor; separating the precipitate from the mother liquor; concentrating, cooling and regenerating the mother liquor and forming sodium hydrogen carbonate; separating the sodium hydrogen carbonate from the regenerated solution; and calcining the sodium hydrogen carboaluminate at a temperature of about 700 to about 900° C. and forming sodium aluminate.

13 Claims, 3 Drawing Sheets

PROCESS FOR COLD HYDROCHEMICAL DECOMPOSITION OF SODIUM HYDROGEN ALUMINOSILICATE

TECHNICAL FIELD

Aspects of the invention relate to the metallurgy of non-ferrous metals, and production of alumina by an alkaline hydrochemical process. in certain example aspects, the invention relates to a process for cold hydrochemical decomposition of sodium hydrogen aluminosilicate.

BACKGROUND

The alkaline hydrochemical process for processing aluminosilicate ores into alumina is particularly applicable for silicon-poor bauxite, whereas it is of only limited interest for other aluminosilicate ores (silicon-rich bauxite) or not applicable (for clays, bauxite similar rocks or sillimanites), basically due to the high losses of useful components such as sodium and aluminum oxide with sodium hydrogen aluminosilicate (viz. Spravočnik metallurga pocvetnym metallam. Proizvodstvo glinozema, M., Metallurgija, 1970, p 141).

In the production of alumina by an alkaline hydrochemical process, the silicon dioxide in the ore being treated is attached to the sodium hydrogen aluminosilicate ($Na_2Al_2Si_2O_8 2H_2O$) which is insoluble in alkaline media. The formation of the sodium hydrogen aluminosilicate causes losses in the reusable components, that is, the sodium and aluminium oxide in stockpiled red mud, during the processing of high-grade bauxite. When processing low-grade bauxites with a high silicon dioxide content, the losses of reusable components are so high that they have to be further processed by sintering.

A known consecutive variant for processing silicon-rich bauxites is the sinter process from Bayer (see A. I. Lajner, Proizvodstvo glinozema, M., Metallurgija, 1961, S. 575). In this process, red mud with a high $Al_2O_3$ and $Na_2O$ content is sintered in a mixture of limestone and soda. The aluminate liquor resulting from the leaching of the sinter cake and separated from silicon is mixed with the aluminate liquor from the Bayer process for joint decomposition. Disadvantages of this process include high capital investment costs, high fuel consumption and considerable environmentally harmful emissions, wherein the composition of the red mud hinders the sintering of the prepared charge.

An alkaline process for the production of alumina from clay by sintering is known (ibid pp. 142-143). The essence of the process resides in sintering the charge consisting of clay, limestone and calcined soda. Solid sodium aluminate is formed at high temperature from the aluminium oxide contained in the charge, is converted into solution, and is subsequently precipitated out of this solution as aluminium hydroxide. Silicon dioxide is bound to dicalcium silicate which is insoluble in alkaline solution. This process, due to its high costs in materials, energy and fuel, as well as high capital costs and considerable environmentally harmful emissions, has lost industrial significance.

An alkaline-acidic process for the production of alumina from silicon-rich aluminium ores is also known (see RF-PS no. 2440296, cl. C01F7/20, published 2012). In this process, the starting material is leached out to form alkali metal hydrogen aluminosilicates that are decomposed at low temperature by treating the mud with a weak solution of a strong acid, where the aluminium and the alkali metals go into solution. Aluminium hydroxide is then separated from this solution. The principal disadvantage of the alkaline-acidic process is in the complicated recovery of the strong acids.

SUMMARY

According to various example aspects, the present invention is directed to the development of a process for hydrochemical decomposition of sodium hydrogen aluminosilicate to reduce losses of valuable components when processing bauxites to form alumina as well as the production of alumina from other aluminosilicate rocks.

In certain example aspects, the invention is directed to a process for cold hydrochemical decomposition of sodium hydrogen aluminosilicate, comprising: decomposing the sodium hydrogen aluminosilicate at a low temperature of less than about 100° C. with a circulating solution of a chelate in the presence of a weak acid to form a solution comprising soluble compounds comprising an aluminum chelate, a silicic acid and a sodium salt of the weak acid, and insoluble contaminants, separating the insoluble contaminants from the solution by adding a coagulator to the solution and heating the solution to a temperature of about 100 to about 120° C. to coagulate the silicic acid and form a silicic acid gel, separating the resulting silicic acid gel from the solution to form a silicic acid-free solution; decomposing the silicic acid-free solution by treating with an excess of sodium hydrogen carbonate to form a precipitate of sodium hydrogen carboaluminate and a mother liquor; separating the precipitate of sodium hydrogen carboaluminate from the mother liquor; concentrating the mother liquor by evaporation; cooling the concentrated mother liquor and regenerating the cooled solution by carbonization with gaseous carbon dioxide under a pressure of at least about 16 bar to form a precipitate of sodium hydrogen carbonate; separating the precipitate of sodium hydrogen carbonate from the regenerated solution; and calcining the sodium hydrogen carboaluminate at a temperature of about 700 to about 900° C. and forming sodium aluminate.

Additional advantages and novel features in accordance with aspects of the invention will be set forth in part in the description that follows, and in part will become more apparent to those skilled in the an upon examination of the following or upon learning by practice thereof.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

According to various example aspects of the invention, crystalline sodium hydrogen aluminosilicate may be decomposed at low temperature with the help of a circulating chelate, for example, with an aqueous solution of a mixture of the sodium salt of ethylenediaminetetraacetic acid and a weak acid. The decomposition of sodium hydrogen aluminosilicate produces the soluble compounds of aluminium chelate, silicic acid and the sodium salt of a weak acid as follows:

$$Na_2Al_2ASi_2O_8 2H_2O+2Na_xH_{(4-x)}edta+2x/yH_yA \rightarrow 2Na[Al\ edta]+2H_4SiO_4+2x/yNa_yA+2H_2O \quad [1]$$

in which A is the anion of a weak add,
x is the degree of substitution of the hydrogen atoms of the carboxyl group of the ethylenediaminetetraacetic acid by the sodium atoms, and may be 1, 2, 3 or 4, y is the basicity of the weak add and may be 1 or 2.

A coagulant may then be added to the resulting solution which may be heated to coagulate the silicic acid and form a gel. The obtained silicic acid gel may then be separated from the solution and aluminium chelate decomposed by treating the solution with excess sodium hydrogen carbonate as follows:

$$Na[Al\ dta]+4NaHCO_3 \leftrightarrows NaAl[CO_3](OH)_2\downarrow+Na_4edta+3CO_2+H_2O \quad [2]$$

Decomposition of the aluminum chelate produces a precipitate of sodium hydrogen carboaluminate and a mother liquor of the chelate. The sodium hydrogen carboaluminate precipitate may then be separated from the mother liquor. The latter may be subsequently evaporated, cooled and regenerated by carbonization under pressure with gaseous carbon dioxide; the sodium hydrogen carbonate crystallizes out and is separated from the solution as follows:

$$Na_4edta+(4-x)CO_2+(4-x)H_2O \rightarrow Na_xH_{(4-x)}edta+(4-x)NaHCO_3\downarrow \quad [3]$$

$$Na_yA+yCO_2+yH_2O=H_yA+yNaHCO_3\eta \quad [4]$$

The regeneration products, that is, the solution of the chelate and the weak acid as well as the sodium hydrogen carbonate may be circulating products.

The sodium hydrogen carboaluminate may then be calcined to form sodium aluminate as follows:

$$NaAl[XO_3](OH)_2 \rightarrow NaAlO_2+H_2O\uparrow+CO_2\uparrow \quad [5]$$

The sodium aluminate may be dissolved in the aluminate solution and then fed back for production of alumina by the Bayer process.

The following schemes illustrate examples for carrying out the invention:

EXAMPLE 1

Figure 1:
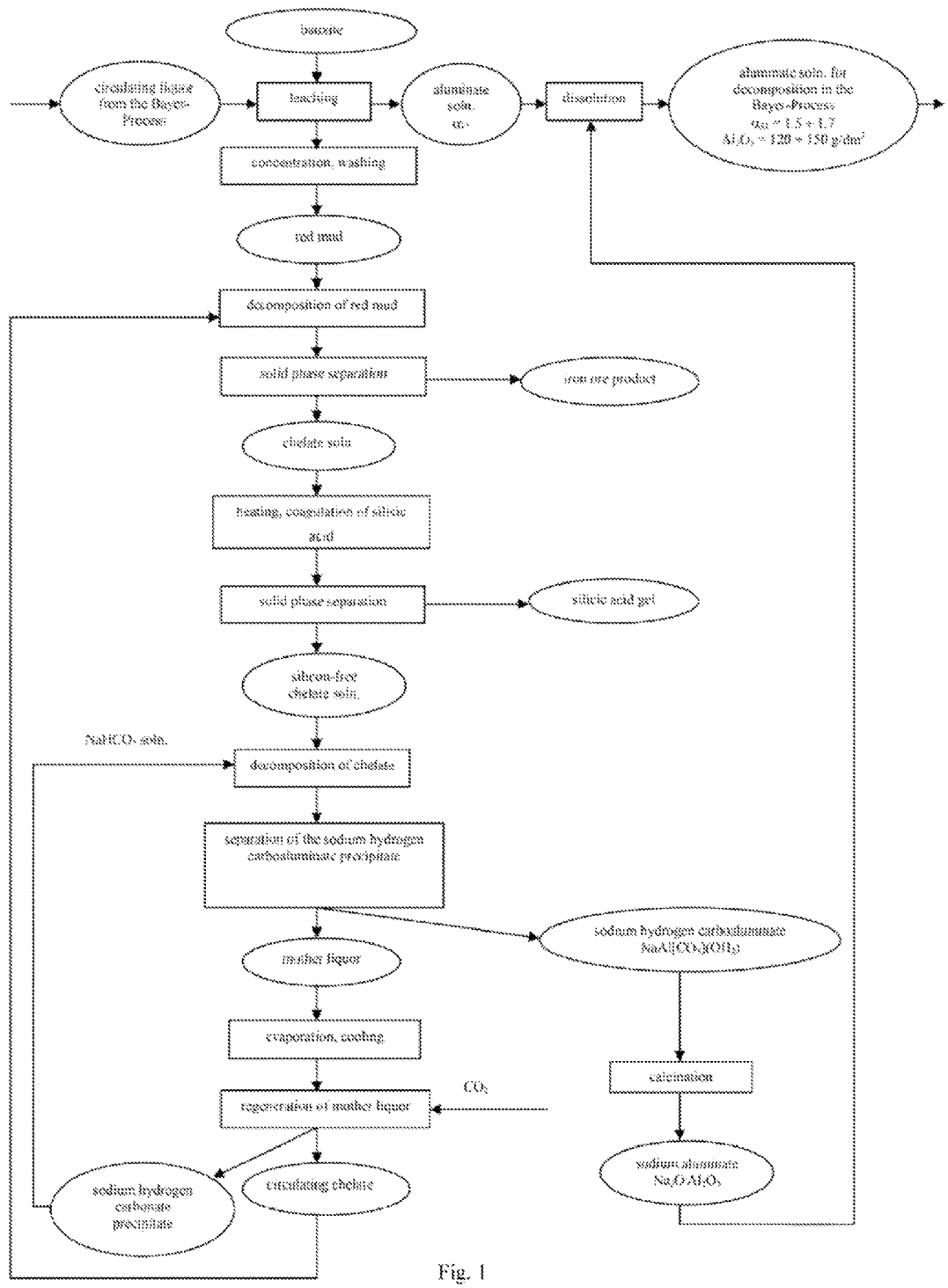
FIG. 1 shows a method for processing red mud according to various example aspects of the invention.

Red Mud Processing (see FIG. 1)

Composition of a solid phase of the red mud:

$Na_2O$—12.8%, $Al_2O_3$—18.6%, $SiO_2$—19.2%, $Fe_2O_3$—33.9%, $TiO_2$—4.3%.

The solid phase of the red mud was decomposed under the following conditions:
  circulating chelate solution:
  concentration of the disodium salt of ethylenediaminetetraacetic acid: 120 g/dm³ and concentration of the acetic acid: 7%,
  temperature: 25° C.,
  decomposition time: 3 hours,
  ratio liquid phase: solid phase: 10:1.

The liquid phase of the reaction products was filtered off from the insoluble precipitate.

Composition of the precipitate (iron one product) was as follows: $Na_2O$—0.31%, $Al_2O_3$—4.70%, $SiO_2$—3.40%, $Fe_2O_3$—75.3%, $TiO_2$—7.3%.

The extraction of the solid phase of the red mud into the liquid phase produced $Na_2O$—98.8%, and $Al_2O_3$—89.0% respectively.

The liquid phase was then held at a temperature of 120° C. for 2 hours in order to coagulate the silicic acid to form a gel.

The resulting silicic acid gel with the following composition: $Na_2O$—1.5%, $Al_2O_3$—1.4% and $SiO_2$—77.9% was filtered off and the silicon-free solution was then decomposed at 90° C. by treatment with a 30% stoichiometric excess of a sodium hydrogen carbonate solution. The decomposition formed a precipitate of sodium hydrogen carboaluminate of the following composition: $Na_2O$—20.4%, $Al_2O_3$—34.4%, $SiO_2$—0.4% und $Fe_2O_3$—0.03%. This precipitate was then filtered off and calcined at a temperature of 700° C. for 30 minutes. The resulting sodium aluminate had the following composition: $Na_2O$—36.3%, $Al_2O_3$—62.2%, $SiO_2$—0.8% and $Fe_2O_3$—0.1%.

EXAMPLE 2

Figure 2:
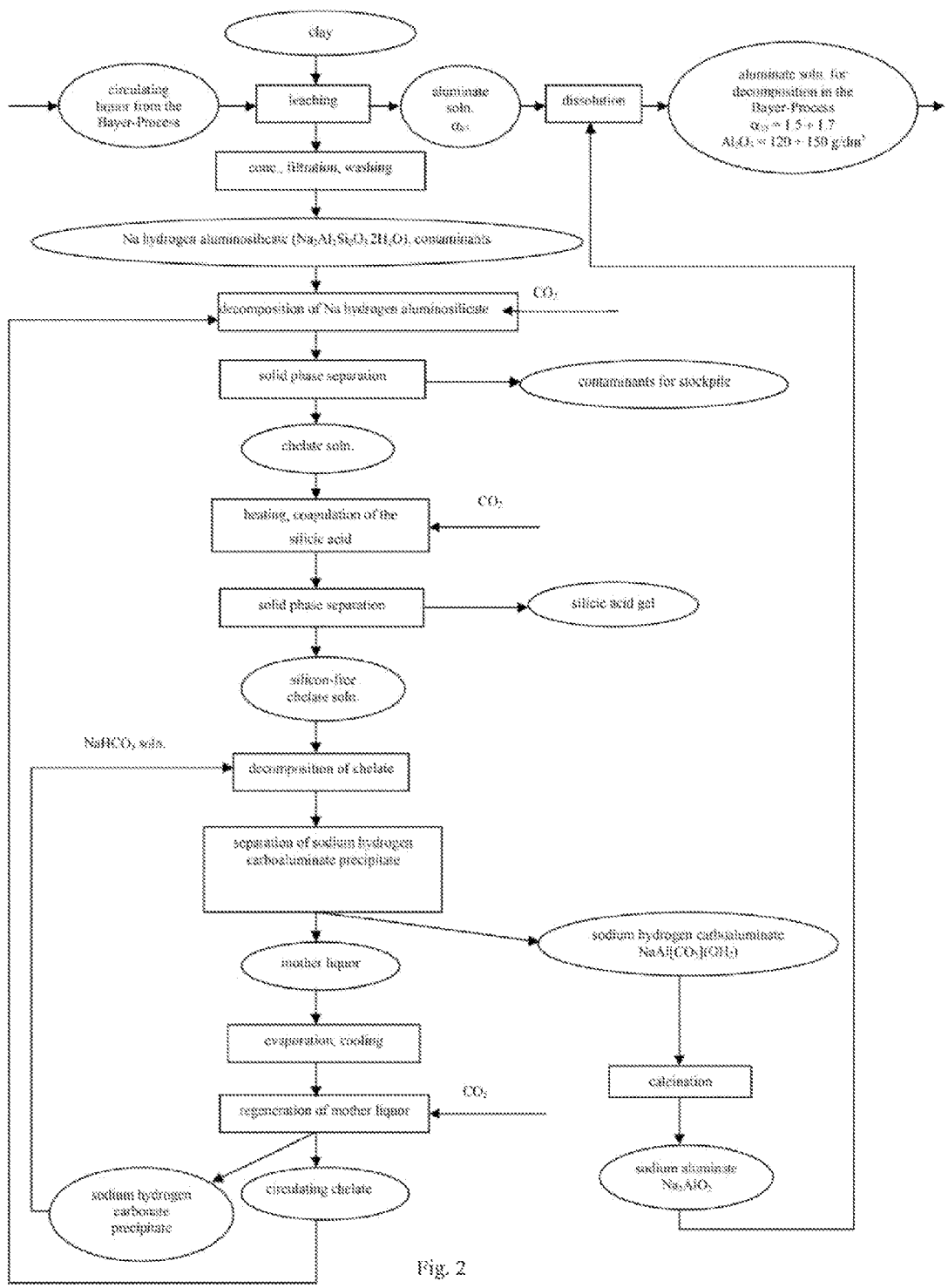
FIG. 2 shows a method of alkaline hydrochemical processing of clay to form alumina according to various example aspects of the invention.

Alkaline Hydrochemical Processing of Clay to Alumina (see FIG. 2)

FIG. 2 shows a method for alkaline hydrochemical processing of clay to form alumina, where the weak acid is carbonic acid.

A batch of clay with the composition $Na_2O$—0.25%, $Al_2O_3$—37.50%, $SiO_2$—44.80%, $Fe_2O_3$—1.59% and $TiO_2$—2.51% was leached out with a solution of caustic liquor under the following conditions:
  concentration of $Na_2O_{ky}$: 120 g/dm³,
  ratio liquid phase: solid phase: 7:1,
  leaching time: 5 hours,
  leaching temperature: 102° C.

The solid phase formed during the leaching process was filtered off and washed. The chemical composition of the solid phase of the leaching product from the clay was as follows: $Na_2O$—19.0%, $Al_2O_3$—29.70%, $SiO_2$—36.30%, $Fe_2O_3$—1.50% and $TiO_2$—2.50%. Composition of the material constituent was: principally sodium hydrogen aluminosilicate ($NA_2Al_2Si_2O_8 2H_2O$).

The sodium hydrogen aluminosilicate was decomposed under the following conditions:
  circulating chelate solution:
  concentration of the disodium salt of ethylenediaminetetraacetic acid: 100 g/dm³,
  ratio liquid phase: solid phase: 10:1,
  temperature: 25° C.,
  $CO_2$ pressure 40 bar,
  decomposition time: 4 hours.

The liquid phase of the reaction products was separated from the insoluble contaminated precipitate and held under a $CO_2$ pressure of 16 bar at a temperature of 120° C. for 2 hours in order to coagulate the silicic acid. The resulting silicic acid gel with the composition: $SiO_2$—84.60%, $Al_2O_3$—0.63%, $Na_2O$—1.15% was filtered off and the silicon-free solution was then decomposed at 25° C. by treatment with a 30% stoichiometric excess of a sodium hydrogen carbonate solution.

The sodium hydrogen carboaluminate precipitate was filtered off from the solution. The composition of the precipitate was as follows: $Na_2O$—21.40%, $Al_2O_3$—36.80%, $SiO_2$—0.81%. The sodium hydrogen carboaluminate was calcined at a temperature of 700° C. for 0.5 hours. The resulting sodium aluminate had the following composition: $Na_2O$—35.80%, $Al_2O_3$—61.50%, $SiO_2$—1.40%.

EXAMPLE 3

Figure 3:
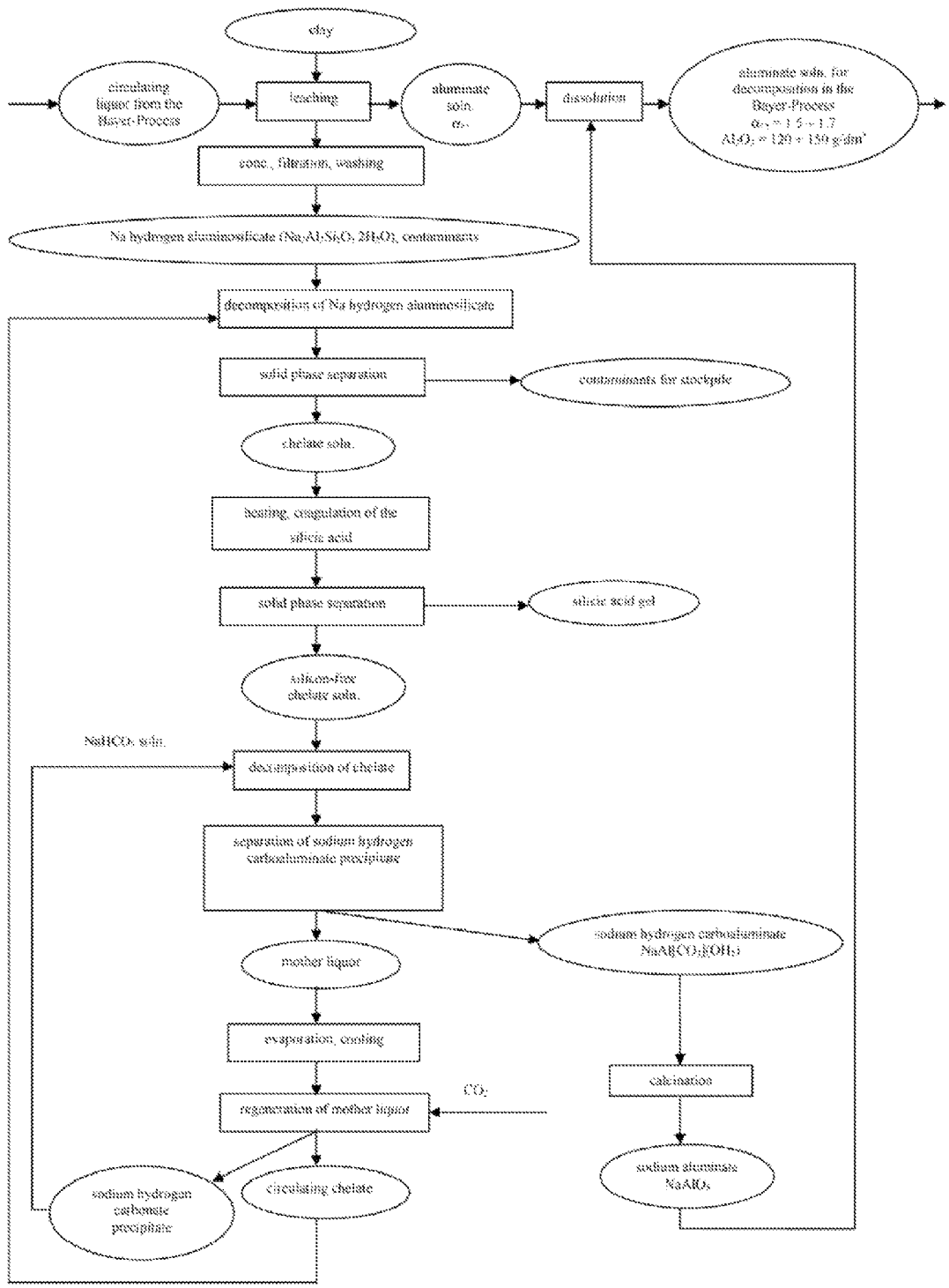
FIG. 3 shows a method of hydrochemical alkaline processing of clay to form alumina according to various example aspects of the invention.

Hydrochemical Processing of Clay to Alumina (see FIG. 3)

FIG. 3 shows a method for alkaline hydrochemical processing of clay to form alumina, where the weak acid is acetic acid.

The batch of clay was leached out as in Example 2.

The sodium hydrogen alumonate was decomposed under the following conditions:
   circulating chelate solution:
   concentration of the disodium salt of ethylenediaminetetraacetic acid 100 g/dm$^3$ and concentration of acetic acid 7%,
   temperature: 25° C.,
   decomposition time: 1.5 hours.

The liquid phase of the reaction products was filtered off from the insoluble contaminated precipitate and held at a temperature of 120° C. within 2 hours in order to coagulate the silicic acid. The resulting silicic acid gel with the composition as follows: $SiO_2$—83.50%, $Al_2O_3$—0.50%, $Na_2O$—0.60%, $Fe_2O_3$—0.05% was filtered off and the silicon-free solution was decomposed at 90° C. by treatment with a 30% stoichiometric excess of a sodium hydrogen carbonate solution.

The sodium hydrogen carboaluminate precipitate was separated from the solution by filtration. Composition of the precipitate was as follows: $Na_2O$—21.30%, $Al_2O_3$—36.70%, $SiO_2$—0.51%. The sodium hydrogen carboaluminate was calcined at a temperature of 700° C. for 0.5 hours. The resulting sodium aluminate had the following composition: $Na_2O$—35.9%, $Al_2O_3$—62.0%, $SiO_2$—0.83%.

In the interest of clarity, not all of the routine features of the aspects are disclosed herein. It win be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A process for cold hydrochemical decomposition of sodium hydrogen aluminosilicate, comprising:

decomposing the sodium hydrogen aluminosilicate at a low temperature of less than about 100° C. with a circulating solution of chelate in the presence of a weak acid to form a solution comprising soluble compounds comprising an aluminum chelate, a silicic acid and a sodium salt of the weak acid, and insoluble contaminants, separating the insoluble contaminants from the solution by adding a coagulator to the solution and heating the solution to a temperature of about 100 to about 120° C. to coagulate the silicic add and form a silicic acid gel, separating the resulting silicic acid gel from the solution to form a silicic acid-free solution;

decomposing the silicic acid-free solution by treating with an excess of sodium hydrogen carbonate to form a precipitate of sodium hydrogen carboaluminate and a mother liquor;

separating the precipitate of sodium hydrogen carboaluminate from the mother liquor;

concentrating the mother liquor by evaporation;

cooling the concentrated mother liquor and regenerating the cooled solution by carbonization with gaseous carbon dioxide under a pressure of at least about 16 bar to form a precipitate of sodium hydrogen carbonate;

separating the precipitate of sodium hydrogen carbonate from the regenerated solution; and calcining the sodium hydrogen carboaluminate at temperature of about 700 to about 900° C. and forming sodium aluminate.

2. The process according to claim 1, wherein the chelate comprises at least one component selected from the group consisting of sodium salts of ethylenediaminetetraacetic add and ethylenediaminetetraacetic acid.

3. The process according to claim 1, wherein the step of decomposing the sodium hydrogen carboaluminate is at a temperature of about 20 to about 45° C.

4. The process according to claim 1, comprising decomposing the aluminium chelate by treatment with a stoichiometric excess of about 30 to about 100% of sodium hydrogen carbonate.

5. The process according to claim 1, wherein the step of separating the silicic acid gel comprises using a circulating solution of seed crystals of silicic acid gel.

6. The process according to claim 1, wherein the step of separating the precipitate of hydrogen carboaluminate comprises using a circulating solution of seed crystals of hydrogen carboaluminate.

7. The process according to claim 1, comprising regenerating the chelate, the weak acid and the sodium hydrogen carbonate and using the regenerated chelate, weak acid and sodium hydrogen carbonate as circulating products.

8. The process according to claim 1, wherein the separated silicic acid gel is adapted for a commercial product.

9. The process according to claim 1, comprising decomposing the insoluble contaminants to form an iron ore product suitable for smelting pig iron to titanium slag.

10. The process of claim 9, wherein the insoluble contaminants comprise red mud.

11. The process of claim 1, wherein the low temperature is about 25° C.

12. The process of claim 1, wherein the sodium aluminate is supplied to a process for forming alumina.

13. The process of claim 12, wherein the process is a Bayer process.

* * * * *